(12) United States Patent
Donat

(10) Patent No.: US 6,919,705 B2
(45) Date of Patent: Jul. 19, 2005

(54) DRIVE SYSTEM

(75) Inventor: Albrecht Donat, Dachsbach (DE)

(73) Assignee: Siemens Aktiengesellschaft, München (DE)

(*) Notice: Subject to any disclaimer, the term of this patent is extended or adjusted under 35 U.S.C. 154(b) by 332 days.

(21) Appl. No.: 10/246,799

(22) Filed: Sep. 18, 2002

(65) Prior Publication Data

US 2003/0057927 A1 Mar. 27, 2003

(30) Foreign Application Priority Data

Sep. 24, 2001 (DE) .......................... 101 46 896

(51) Int. Cl.⁷ .............................................. H02P 1/46
(52) U.S. Cl. .................... 318/700; 318/137; 318/703
(58) Field of Search .......................... 363/137; 318/700, 318/703, 771, 362, 364, 366

(56) References Cited

U.S. PATENT DOCUMENTS

| 3,045,166 A | 7/1962 | Robinson |
| 4,560,895 A * | 12/1985 | Zahner ......................... 310/77 |
| 5,247,140 A | 9/1993 | Iwasa et al. |
| 6,219,265 B1 * | 4/2001 | Bernet et al. ............... 363/137 |
| 2002/0113562 A1 * | 8/2002 | Raith et al. ................. 318/114 |

FOREIGN PATENT DOCUMENTS

| DE | V 5439 VIIIB/21 | 5/1956 |
| DE | OS 1 638 164 | 6/1971 |
| DE | 204 012 | 11/1983 |
| DE | 204 013 | 11/1983 |
| DE | 197 34 405 A1 | 2/1999 |
| DE | 198 03 899 | 8/1999 |
| JP | 05344776 A | 12/1993 |
| JP | 07079583 A | 3/1995 |
| JP | 01844665 | 6/1996 |
| JP | 2001016881 | 6/1999 |
| JP | 2001016881 | 1/2001 |

* cited by examiner

*Primary Examiner*—Karen Masih
(74) *Attorney, Agent, or Firm*—Henry M. Feiereisen

(57) ABSTRACT

A drive system, includes a motor having a neutral terminal, a converter, which has a voltage intermediate circuit and is electrically connected to the motor, a switching device, and a holding brake, which is mechanically connected to the motor. The holding brake has a first terminal, which is connected to the neutral terminal of the motor, and a second terminal, which is connected with a negative busbar of the voltage intermediate circuit via the switching device.

10 Claims, 1 Drawing Sheet

DRIVE SYSTEM

CROSS-REFERENCES TO RELATED APPLICATIONS

This application claims the priority of German Patent Application, Serial No. 101 46 896.2, filed Sep. 24, 2001, pursuant to 35 U.S.C. 119(a)–(d), the content of which is incorporated herein by reference.

BACKGROUND OF THE INVENTION

The present invention relates, in general, to a drive system, and more particularly to a drive system of a type including a motor, a converter with a voltage intermediate circuit, and a holding brake, whereby the holding brake is mechanically connected to the motor and the converter is electrically connected to the motor.

Drive systems of this type are employed in applications when the motor is at a standstill and has to be held in this stop position. Applications that require such drive systems, include, for example, elevators or cranes.

It is generally known to equip the holding brake for actuation with a contactor, an external DC supply, and a brake control unit. The external DC supply is electrically connected in parallel to terminals of the holding brake, whereby the contactor is positioned in one such connection. The contactor is controlled by the brake control unit, which receives a brake signal from a primary control device. Such a conventional drive system suffers shortcomings because of the need for external wiring and the incorporation of a contactor. As the contactor delay time is unknown, also the brake switching delay time is unknown. This leads to problems as far as projecting the delay time between the brake control and control of the converter, which powers the motor, is concerned. Thus, as soon as the motor is held in stop position by the holding brake, there is no need to supply the motor via the converter with electric energy so that the pulses of the converter are blocked.

Attempts were made to address the problem of unknown delay times by assigning the control of the holding brake to the converter rather than to the brake control unit. As a consequence, dead times are omitted between the command of a brake control unit and the enablement of the internal pulse of the converter which now regulates by itself the time behavior of the brake control and the pulse enablement. Moreover, the holding brake includes a contactor and an external DC supply, which have to be wired together.

It would therefore be desirable and advantageous to provide an improved drive system to obviate prior art shortcomings.

SUMMARY OF THE INVENTION

According to one embodiment of the present invention, a drive system includes a motor having a neutral terminal, a converter having a voltage intermediate circuit and being electrically connected to the motor; a switching device; and a holding brake mechanically connected to the motor and having a first terminal connected to the neutral terminal of the motor and a second terminal connected with a negative terminal of the voltage intermediate circuit via the switching device.

The present invention resolves prior art problems by connecting one terminal of the holding brake with a neutral terminal of the motor and another terminal with a negative terminal of the voltage intermediate circuit of the converter via the switching device so that the need for a contactor and an external DC supply is eliminated. As a result, the complexity of wiring is significantly reduced because provision is required for only one additional line with a switching device to be placed between the holding brake and motor. The electric connection of one terminal of the holding brake with the neutral terminal of the motor extends directly between the holding brake and the motor. By means of the switching device, the braking circuit is closed in response to a brake signal, thereby applying a voltage to the holding brake to effect a venting of the holding brake.

According to another feature of the present invention, the switching device may be formed as part of the converter, and may be a controllable semiconductor, which can be switched off.

According to another feature of the present invention, the holding brake may be an electrically ventable magnetic brake, and the motor may be a synchronous motor. Suitably, the motor and the holding brake may be constructed to form a structural unit.

According to another embodiment of the present invention, a drive system, includes a motor having a neutral terminal, a converter having a voltage intermediate circuit and being electrically connected to the motor, and a holding brake mechanically connected to the motor and having one terminal connected to the neutral terminal of the motor and another terminal connected to a midpoint connection of the voltage intermediate circuit. In this embodiment, provision is made to connect a terminal of the holding brake directly with the midpoint connection.

As a result of this connection, no voltage is applied to the holding brake during normal motor operation because the voltage at the neutral terminal is on average equal to the voltage at the midpoint connection of the voltage intermediate circuit of the converter. To enable a venting of the holding brake, the phase voltages of the motor are acted upon by an offset voltage which is then applied to the holding brake. In this way, there is no need for a separate switching device so that a standard converter with midpoint connection of the voltage intermediate circuit can be used, i.e. there is need for only one line connection between converter and motor with holding brake.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
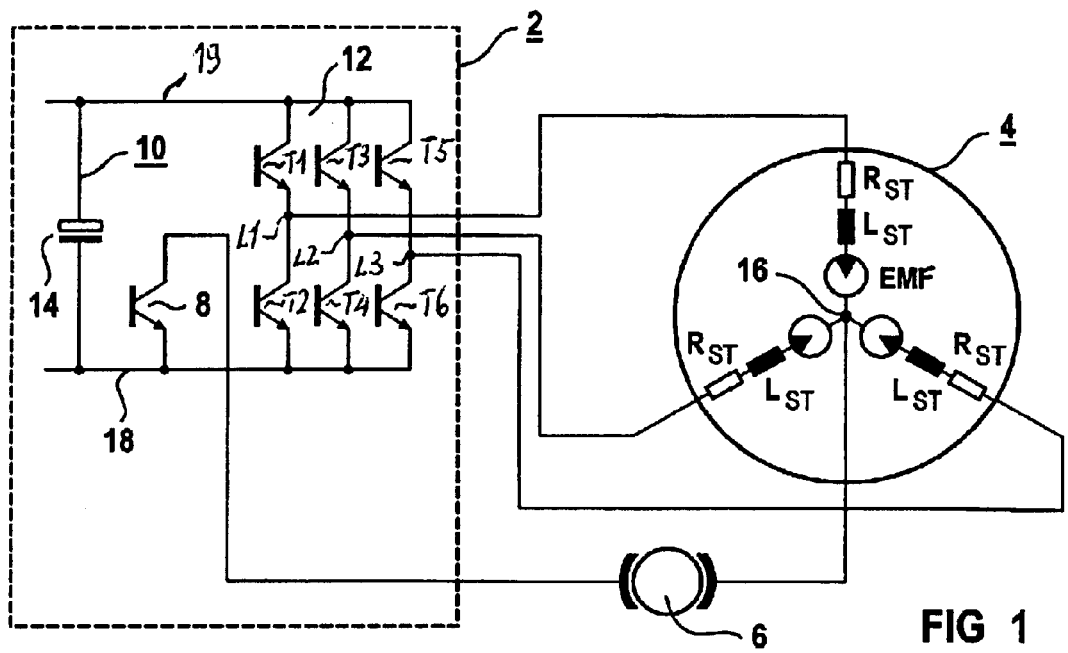
FIG. 1 is an equivalent circuit diagram of a first embodiment of a drive system according to the present invention.

Throughout all the Figures, same or corresponding elements are generally indicated by same reference numerals.

Turning now to the drawing, and in particular to FIG. 1, there is shown an equivalent circuit diagram of a first embodiment of a drive system according to the present invention, including a converter 2 which, for ease of illustration, is shown here to have only a voltage intermediate circuit 10 and a load-side power converter 12, also called inverter. When a standard converter is involved, the converter includes on the mains system side also an uncontrolled power converter, also called rectifier. The drive system further includes a motor 4 having inductances ($L_{ST}$) and resistances ($R_{ST}$) in star configuration to induce respective electromotive forces (EMF), whereby the individual arms are united at a neutral terminal 16. The motor 4 is connected in an electrically conductive manner with phase outputs L1, L2, L3 of the motor-side inverter 12. The inverter 12 includes six valve arms in the form of controllable converter valves T1, T2, T3, T4, T5, T6, which can be switched off or disabled, whereby the converter valves T1, T3, T5 are arranged in the upper bridge side and the converter valves T2, T4, T6 are arranged in the lower bridge side. Converter valves T1 and T2 of the upper and lower bridge sides of the inverter 12 form a bridge arm as do converter valves T3 and T4, and converter valves T5 and T6, and are connected between a negative busbar 18 and a positive busbar 19 of the voltage intermediate circuit 10.

In the embodiment of the drive system of FIG. 1, the voltage intermediate circuit 10 is not provided with a midpoint connection so that only one electrolytic capacitor 14 is shown in the equivalent electric circuit. The inverter 12 is electrically connected on the DC voltage side with the voltage intermediate circuit 10, whereby the motor 4 is electrically connected on the AC voltage side with the inverter 12.

A holding brake 6 is connected between the motor 4 and a switching device 8, and has one terminal which is connected with the neutral terminal 16 of the motor 4 and another terminal which is connected via the switching device 8 with the negative busbar 18 of the voltage intermediate circuit 10. The switching device 8 is configured as controllable semiconductor switch which can be switched off and, as shown in the nonlimiting example of FIG. 1, forms part of the converter 2. Of course, the negative busbar 18 of the converter 2 has to be accessible.

As soon as a brake signal is present, the switching device 8 is activated to close the braking circuit (not shown) of the holding brake 6. As a result, a voltage is applied to the holding brake 6 which voltage is approximately have the voltage of the voltage intermediate circuit 10. This voltage is generated during normal motor operation because the potential of the neutral terminal 16 is on average zero and the potential of the negative busbar 18 is negative. In the absence of the switching device 8, this voltage would be applied permanently to the holding brake 6 so that the motor 4 could never be released. This embodiment is preferred in configurations in which the voltage intermediate circuit 10 has no midpoint connection.

Figure 2:
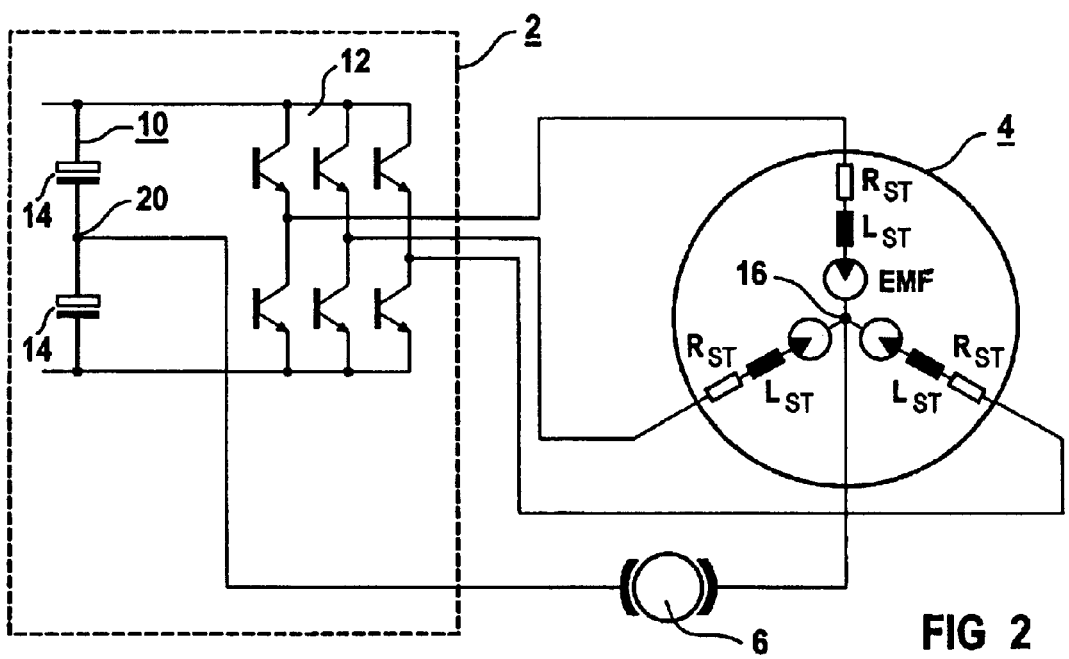
FIG. 2 is an equivalent circuit diagram of a second embodiment of a drive system according to the present invention.

Turning now to FIG. 2, there is shown an equivalent circuit diagram of a second embodiment of a drive system according to the present invention. Parts corresponding with those in FIG. 1 are denoted by identical reference numerals and not explained again. In this embodiment, provision is made for a voltage intermediate circuit 10 with midpoint connection 20. The voltage intermediate circuit 10 has hereby two electrolytic capacitors 14 connected electrically in series. Otherwise, the drive system of FIG. 2 corresponds to the drive system of FIG. 1.

During normal motor operation, the mean potential of the neutral terminal 16 is furnished at the potential of half the voltage of the voltage intermediate circuit 10. Also the potential of the midpoint connection 20 of the voltage intermediate circuit 10 is furnished at half the intermediate circuit voltage. As a consequence, no voltage is applied to the holding brake 6 on average during a normal motor operation.

Upon presence of a brake signal, the phase voltages of the motor 4 are generated in such a manner that a DC voltage is applied to every phase voltage. The DC voltage is called "offset voltage" and has in each case a value, which corresponds to a release voltage for the holding brake 6. By means of the offset voltages, the potential at the neutral terminal 16 is higher by the value of this offset voltage than the potential at the midpoint connection 20 of the voltage intermediate circuit 10 of the converter 2. Thus, this offset voltage is applied as release voltage at the holding brake 6.

As a consequence of the applied offset voltages of the three phase voltages, the holding brake 6 can thus be addressed directly by the converter 2. This has the following advantages:

reduction of the number of conductors in the motor feed, no external components such as contactor or DC supply are required, no projection for the brake delay time is required because all required times are available for the converter 2, and the braking current is known and thus the moment when the holding brake 6 is vented.

Commercially available are motors 4 with integrated holding brake 6. When applying such a structural unit in a drive system according to the invention, the electric connection of one terminal of the holding brake 6 with the neutral terminal 16 of the motor 2 can be solidly wired internally. Thus, only four connection lines have to be provided between converter 2 and motor 4 with integrate holding brake 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A drive system, comprising:

a motor having a neutral terminal;

a converter having a voltage intermediate circuit and being electrically connected to the motor;

a switching device; and a holding brake mechanically connected to the motor and having a first terminal connected to the neutral terminal of the motor and a second terminal connected with a negative busbar of the voltage intermediate circuit via the switching device.

2. The drive system of claim 1, wherein the switching device is part of the converter.

3. The drive system of claim 1, wherein the switching device is a controllable semiconductor, which can be switched off.

4. The drive system of claim 1, wherein the holding brake is an electrically ventable magnetic brake.

5. The drive system of claim 1, wherein the motor is a synchronous motor.

6. The drive system of claim 1, wherein the motor and the holding brake are constructed to form a structural unit.

7. A drive system, comprising:
a motor having a neutral terminal;
a converter having a voltage intermediate circuit and being electrically connected to the motor; and
a holding brake mechanically connected to the motor and having a first terminal connected to the neutral terminal of the motor and a second terminal connected with a midpoint connection of the voltage intermediate circuit.

8. The drive system of claim 7, wherein the holding brake is an electrically ventable magnetic brake.

9. The drive system of claim 7, wherein the motor is a synchronous motor.

10. The drive system of claim 7, wherein the motor and the holding brake are constructed to form a structural unit.

* * * * *